No. 771,490. Patented October 4, 1904.

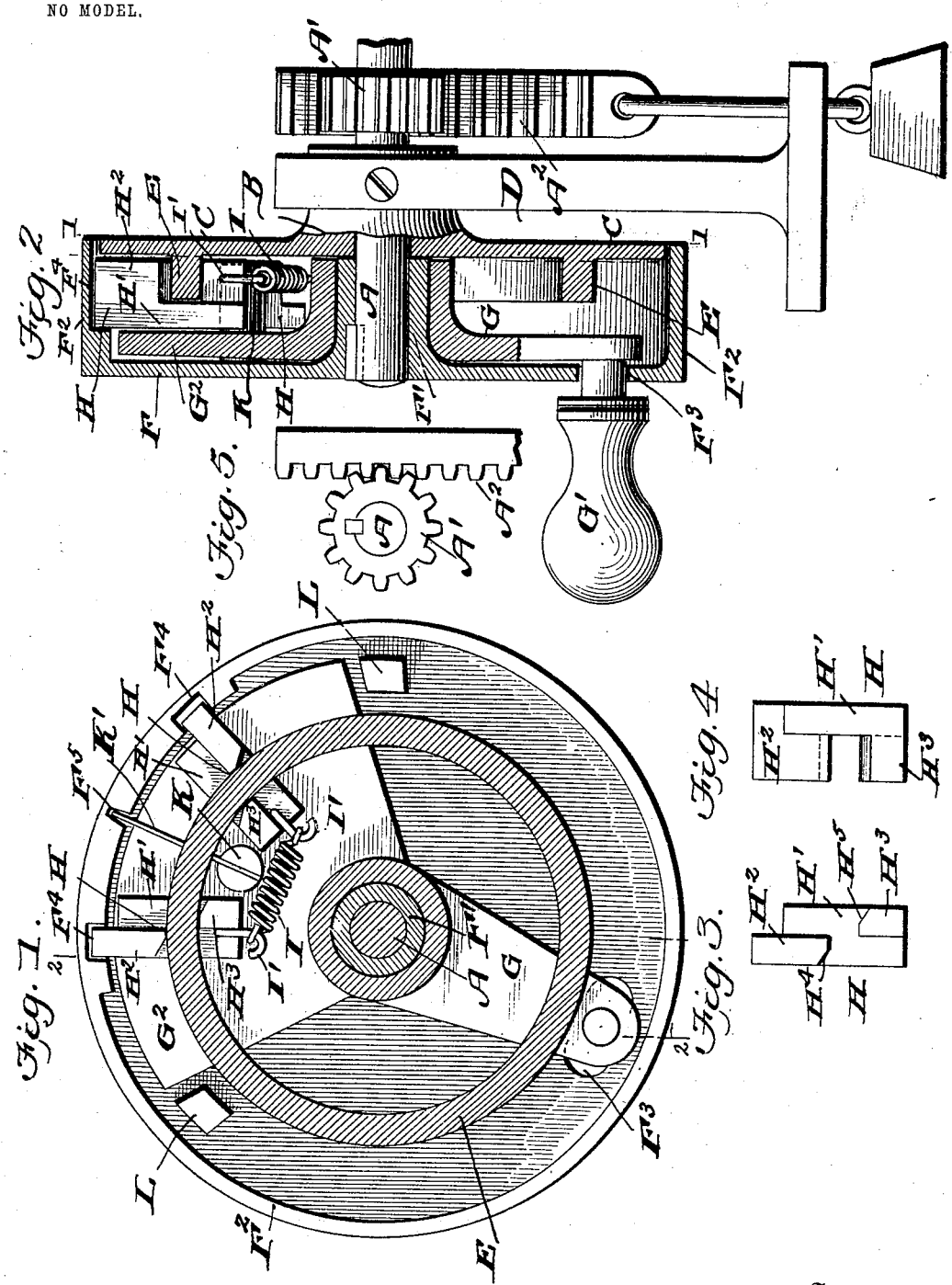

UNITED STATES PATENT OFFICE.

JOHN H. PALMER, OF WASHINGTON, DISTRICT OF COLUMBIA.

SHAFT-LOCKING DEVICE.

SPECIFICATION forming part of Letters Patent No. 771,490, dated October 4, 1904.

Application filed February 15, 1904. Serial No. 193,607. (No model.)

*To all whom it may concern:*

Be it known that I, JOHN H. PALMER, a citizen of the United States, residing at Washington, in the District of Columbia, have invented a new and useful Shaft-Locking Device, of which the following is a specification.

This invention is an improved construction of device for quickly and automatically locking a rotary shaft against further rotary movement the moment the rotating power is removed; and the object of the invention is to provide a device of this kind which can be quickly and easily attached to any shaft and which will permit the rotation of the shaft in either direction, but will prevent any rotary movement from power applied at the other end of the shaft, as by the gravitation of the weight which has been raised and is held suspended by a rack and pinion.

With these objects in view my invention consists, essentially, in the employment of a ring, which surrounds the rotary shaft and is fixed, and a gripping device adapted to engage the said fixed ring, said gripping device being carried by a wheel or disk keyed upon the rotary shaft, together with means for throwing the gripping device into and out of engagement with the fixed ring.

The invention consists also in the employment of a pair of gripping devices oppositely disposed, so that one device will operate when the shaft is moved in one direction and the other one in the opposite direction, thereby rendering the invention applicable to shafts which rotate alternately in opposite directions.

The invention consists also in certain details of construction and novelties of combination, all of which will be fully described hereinafter, and pointed out in the claims.

In the drawings forming a part of this specification, Figure 1 is a sectional elevation on the line 1 1 of Fig. 2. Fig. 2 is a sectional view on the line 2 2 of Fig. 1. Fig. 3 is a face view of one of the gripping devices. Fig. 4 is a side view of the same, and Fig. 5 is a detail view of the rack and pinion.

In the practical application of my invention I employ a shaft A, which is journaled in the hub B of a disk C, said hub being fixed in a bracket D. Mounted upon the shaft A is a pinion A', which meshes with the rack-bar $A^2$, which rack-bar may form a part of or be connected with any suitable mechanism, and the bracket D may be of any desired construction or form a part of any device or mechanism. The disk C is provided with a circular ring E, which surrounds the end of the shaft A, which projects through the hub B, said ring E being concentric with reference to the shaft A. A disk or wheel F is keyed upon the end of the shaft A, said disk or wheel having a hub portion F' and a rim portion $F^2$, said rim portion being of such a depth as to embrace the fixed circular disk C, as most clearly shown in Fig. 2. A lever G is mounted upon the hub portion F' of the wheel or disk F, said lever being provided with a handle G, at one end, which passes through a slot $F^3$, produced in the wheel or disk F. The opposite arm of the lever is essentially in the shape of a segment, as shown at $G^2$, and between this segment-shaped arm and the fixed disk C are arranged the gripping devices H, which are adapted to be carried by the wheel or disk and which engage the fixed ring E for the purpose of preventing the wheel F, and consequently the shaft A, from rotating. These gripping devices H are arranged in pairs, right and left handed, so that the device can be used upon shafts which are rotated in either or both directions, and while various forms of gripping devices might be employed I have shown a device which is well adapted for the purpose and which consists of a plate H', the outer jaw $H^2$, and the inner jaw $H^3$, the ends of said jaws being beveled or cut away in opposite directions, as most clearly shown at $H^4$ and $H^5$, and it will be noted that the jaws of one gripping device are cut upon one angle while the jaws of the other gripping device are cut upon an opposite angle, thereby rendering the devices right and left hand grips. The jaws are spaced a sufficient distance apart to permit the fixed ring E to pass therebetween, and the plate H' rests adjacent the segment-shaped arm $G^2$, as most clearly shown in Figs. 1 and 2. The outer ends of the outer arm rest in recesses $F^4$, produced in the inner face of the rim $F^2$, and the inner end of the gripping devices are connected by means of a spring I, through the medium of hooks I', carried by the gripping devices, the tendency of said spring being to normally throw the gripping-jaws into engagement with the fixed ring, thereby locking the disk or wheel, and consequently the shaft. A stud K is carried by the segment-arm $G^2$, said stud being split and having a flat spring K' fastened therein, the free end of said spring resting in a recess $F^5$, produced also in the rim $F^2$, and substantially midway between the recesses $F^4$.

In order to unlock one of the gripping devices and move the wheel, and consequently rotate the shaft, the handle of the lever is moved in the desired direction, which movement causes the segment-shaped arm to move in the opposite direction, and the stud K will engage the inner end of the gripping device and force the same out of engagement with the fixed ring E, and by this time the segment has come in contact with one of the stop-plugs L, formed integral with the wheel or disk F, and the said wheel or disk will then be revolved, rotating the shaft A, and the moment the proper amount of rotation has been had power is removed from the lever, and the spring K' will immediately return the gripping devices to their normal or gripping positions, thereby securely locking the wheel or disk, and consequently the shaft.

It will of course be understood that by having the gripping devices arranged in pairs when one is disengaged and moving around the fixed ring the other one will not bind upon the ring.

It will thus be seen that I provide an exceedingly simple and highly-efficient means for instantly and automatically locking a shaft against rotation the moment the rotating power is removed.

Having thus fully described my invention, what I claim as new, and desire to secure by Letters Patent, is—

1. The combination with a shaft free to rotate, of a fixed ring surrounding said shaft, a disk mounted upon the shaft and adapted to rotate therewith, a gripping device carried by the disk and adapted to engage the fixed ring together with means carried by the disk for disengaging the gripping device, and rotating said disk.

2. The combination with a shaft adapted to rotate, of a fixed ring surrounding said shaft, a disk mounted upon the shaft, oppositely-disposed gripping devices, arranged upon the fixed ring and carried by the disk, together with means for releasing said devices, and rotating the shaft.

3. The combination with a fixed disk having a circular ring rigid therewith, of a shaft journaled in the said fixed disk, a rotary disk fixed upon the end of the rotary shaft, a gripping device arranged upon the fixed ring, and adapted to normally engage the same, and a lever adapted to disengage the said gripping device and rotate the disk and shaft.

4. The combination with the fixed disk and ring, of the rotary shaft and disk, said rotary disk having a circular rim, and a central hub, a lever mounted upon said hub and having a handle extending through a slot in the disk, the oppositely-disposed gripping devices arranged upon the fixed ring, the outer ends of said gripping devices engaging the rim of the rotary disk, and means carried by the lever for engaging the inner ends of the said gripping devices to release them from the fixed ring.

5. The combination with the fixed disk and ring, of the rotary shaft and disk, said rotary disk having a circular rim and a central hub, a lever mounted upon said hub, and having a handle extending through a slot in the disk, the oppositely-disposed gripping devices arranged upon the fixed ring, the outer ends of said gripping devices resting in recesses in the circular rim, a stud carried by the lever between the inner ends of the gripping devices, together with means for limiting the movements of the lever and causing the rotary disk to rotate with the lever.

6. The combination with the fixed disk and ring, of the rotary shaft and disk, said rotary disk having a circular rim and a central hub, a lever mounted upon said hub and having a handle extending through a slot in the disk, the oppositely-disposed gripping devices arranged upon the fixed ring, the outer ends of said gripping devices resting in recesses in the circular rim, the inner ends of said gripping devices being connected by means of a spring, a stud carried by the lever between the gripping devices, a leaf-spring attached to said stud, the free end of said leaf-spring resting in a recess in the circular rim, and the stop-lugs carried by the rotary disks, and with which the lever contacts as set forth.

7. The combination with the rotary shaft, of a fixed ring surrounding said shaft, a gripping device arranged upon the fixed ring and comprising a pair of gripping-jaws and a connecting-plate, a lever free to turn with reference to the shaft, said lever carrying a stud adapted to engage the gripping device to release the same, a disk fixed upon the rotary shaft and provided with means for limiting the oscillation of the lever, together with means for returning the lever to its normal position, said lever being adapted to rotate with the disk and shaft after the gripping device has been released from the fixed ring as set forth.

JOHN H. PALMER.

Witnesses:
CHAS. E. BROCK,
M. D. BLONDEL.